(12) United States Patent
Baumgartner et al.

(10) Patent No.: US 9,280,626 B2
(45) Date of Patent: *Mar. 8, 2016

(54) EFFICIENTLY DETERMINING BOOLEAN SATISFIABILITY WITH LAZY CONSTRAINTS

(75) Inventors: Jason R. Baumgartner, Austin, TX (US); Michael L. Case, Pflugerville, TX (US); Robert L. Kanzelman, Rochester, MN (US); Hari Mony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 986 days.

This patent is subject to a terminal disclaimer.

(21) Appl. No.: 13/458,252

(22) Filed: Apr. 27, 2012

(65) Prior Publication Data

US 2012/0271792 A1    Oct. 25, 2012

Related U.S. Application Data

(63) Continuation of application No. 13/092,262, filed on Apr. 22, 2011, now Pat. No. 8,589,327.

(51) Int. Cl.
| | |
|---|---|
| G06F 9/44 | (2006.01) |
| G06N 7/02 | (2006.01) |
| G06N 7/06 | (2006.01) |
| G06F 17/50 | (2006.01) |
| G06F 17/11 | (2006.01) |

(52) U.S. Cl.
CPC .............. *G06F 17/504* (2013.01); *G06F 17/11* (2013.01); *G06F 2217/06* (2013.01)

(58) Field of Classification Search
None
See application file for complete search history.

(56) References Cited

U.S. PATENT DOCUMENTS

| | | | |
|---|---|---|---|
| 7,383,166 B2 | 6/2008 | Ashar et al. | |
| 2003/0225552 A1 | 12/2003 | Ganai et al. | |

(Continued)

FOREIGN PATENT DOCUMENTS

| | | |
|---|---|---|
| DE | 10243598 A1 | 4/2003 |
| EP | 1515251 A1 | 3/2005 |

(Continued)

OTHER PUBLICATIONS

Jin et la. "An Incremental Algorithm to Check Satisfiability for Bounded Model Checking", Electronic Notes in Theoretical Computer Science 119 (2005) pp. 51-65.*

(Continued)

*Primary Examiner* — Li-Wu Chang
(74) *Attorney, Agent, or Firm* — Francis Lammes; Stephen J. Walder, Jr.; Parashos T. Kalaitzis

(57) ABSTRACT

A mechanism is provided for efficiently determining Boolean satisfiability (SAT) using lazy constraints. A determination is made as to whether a SAT problem is satisfied without constraints in a list of constraints. Responsive to the SAT problem being satisfied without constraints, a set of variable assignments that are determined in satisfying the SAT problem without constraints are fixed. For each constraint in the list of constraints, a determination is made as to whether the SAT problem with the constraint results in the set of variable assignments remaining constant. Responsive to the SAT problem with the constraint resulting in the set of variable assignments remaining constant, the constraint is added to a list of non-affecting constraints and a satisfied result is returned.

6 Claims, 6 Drawing Sheets

(56) References Cited

U.S. PATENT DOCUMENTS

| | | |
|---|---|---|
| 2004/0019468 A1 | 1/2004 | De Moura et al. |
| 2004/0230407 A1 | 11/2004 | Gupta et al. |
| 2006/0085782 A1 | 4/2006 | Ward |
| 2007/0226666 A1 | 9/2007 | Ganai et al. |
| 2009/0007038 A1 | 1/2009 | Wang et al. |
| 2009/0100385 A1 | 4/2009 | Baumgartner et al. |
| 2009/0300559 A1 | 12/2009 | Baumgartner et al. |
| 2010/0223584 A1 | 9/2010 | Baumgartner et al. |

FOREIGN PATENT DOCUMENTS

| | | |
|---|---|---|
| EP | 2084615 A1 | 8/2009 |
| JP | 2005285017 | 10/2005 |
| WO | WO2008/064185 A1 | 5/2008 |

OTHER PUBLICATIONS

Office Action mailed Jun. 5, 2012 for U.S. Appl. No. 13/092,304, 14 pages.
U.S. Appl. No. 13/458,534, Jul. 27, 2012, 1 page.
Interview Summary mailed Sep. 5, 2012, U.S. Appl. No. 13/092,304, 3 pages.
Notice of Allowance mailed Nov. 26, 2012 for U.S. Appl. No. 13/092,304, 7 pages.
Office Action mailed Oct. 2, 2012 for U.S. Appl. No. 13/458,534, 18 pages.
Response to Office Action filed Sep. 4, 2012, U.S. Appl. No. 13/092,304, 14 pages.
Office Action mailed Apr. 9, 2013 for U.S. Appl. No. 13/092,262, 18 pages.
Response to Office Action flied Jun. 19, 2013, U.S. Appl. No. 13/092,262, 13 pages.
Aloul Fadi A. et al., "PBS: A Backtrack-Search Pseudo-Boolean Solver and Optimizer", SAT 2002, submitted, 8 pages.
Een, Niklas et al., "An Extensible SAT-solver", LNCS 2919, 2004, pp. 502-518.
Whittemore, Jesse et al., "SATIRE: A New Incremental Satisfiability Engine", DAC 2001, 4 pages.
U.S. Appl. No. 13/092,262, 1 page.
U.S. Appl. No. 13/092,304, 1 page.
Bjesse, Per et al., "SAT-based Verification without State Space Traersal", Proceedings of the Third International Conference on Formal Methods in Computer-Aided Design (FMCAD'00), 2000, 18 pages.
Czarnecki, Krzysztof et al., "Feature Diagrams and Logics: There and Back Again", Proceedings of the 11th International Software Product Line Conference (SPLC'07), Kyoto, Japan, Sep. 10-14, 2007, 10 pages.
Gupta, Aarti et al., "Lazy Constraints and SAT Heuristics for Proof-based Abstraction", Proceedings of the 18th International Conference on VLSI Design held jointly with 4th International Conference on Embedded Systems Designs (VLSID/05), Kolkata, India, Jan. 3-7, 2005, 6 pages.
Mony, Hari et al., "Speculative Reduction-Based Scalable Redundancy Identification", Proceedings of the Conference on Design, Automation and Test in Europe, 2009, 6 pages.
Tarjan, Robert, "Depth-First Search and Linear Graph Algorithms", SIAM Journal on Computing, vol. 1, No. 2, Jun. 1972, pp. 146-160.
Van Eijk, C. A., "Sequential Equivalence Checking without State Space Traversal", Design, Automation and Test in Europe, Paris, France, Feb. 23-26, 1998, pp. 618-823.
Notice of Allowance mailed Mar. 4, 2013, U.S. Appl. No. 13/458,534, 6 pages.
Response to Office Action filed Jan. 2, 2013, U.S. Appl. No. 13/458,534, 15 pages.
Notice of Allowance mailed Jul. 9, 2013 for U.S. Appl. No. 13/092,262, 10 pages.

* cited by examiner

```
function satisfy_another(constraint) {     ⎯402
    fix previous assignments               ⎯404
    return satisfy(cnf/circuit)            ⎯406
}
```

FIG. 4

```
function satisfy_lazy(cnf, constraints) {     ⎯502
    affectingConstraints = empty list
  satisfy_again:
    result = satisfy(cnf & affectingConstraints)
    if (result == satisfied) {
        for all constraints C not in affectingConstraints {
            resultC = satisfy_another(C)
            if (resultC == unsatisfiable) {
                add C to affectingConstraints
                goto satisfy_again
            } else if (resultC == inconclusive) {
                return inconclusive
            }
        }
        return satisfied
    } else if (result == unsatisfiable) {
        return unsatisfiable
    } else if (result == inconclusive) {
        return inconclusive
    }
}
```

FIG. 5

```
function satisfy_lazy(cnf, constraints) {
    affectingConstraints = empty list                    ⎯602
    for all constraints C with (importance > THRESHOLD) {  ⎫
        add C to affectingConstraints                      ⎬ 604
    }                                                      ⎭ for all constraints C {                                ⎫
        C.importance *= DECAY                              ⎬ 606
    }                                                      ⎭ satisfy_again:                                         ⎫
        result = satisfy(cnf & affectingConstraints)       ⎪
        if (result == satisfied) {                         ⎪
            for all constraints C not in affectingConstraints {  ⎪
                resultC = satisfy_another(C)               ⎪
                if (resultC == unsatisfiable) {    ⎯610    ⎪
                    add C to affectingConstraints          ⎪
                    C.importance += INCREMENT              ⎪
                    goto satisfy_again                     ⎬ 608
                } else if (resultC == inconclusive) {      ⎪
                    return inconclusive                    ⎪
                }                                          ⎪
            }                                              ⎪
            return satisfied                               ⎪
        } else if (result == unsatisfiable) {              ⎪
            return unsatisfiable                           ⎪
        } else if (result == inconclusive) {               ⎪
            return inconclusive                            ⎪
        }                                                  ⎭
}
```

*FIG. 6*

```
function satisfy_another_vec(cnf, constraints) {                          ─702
    partition constraints into N partitions based on importance           ─704
    affectingConstraints = empty list
    for all constraints C with (importance > THRESHOLD) {                 ⎫ 706
        add C to affectingConstraints                                     ⎭
    } for all constraints C {                                               ⎫ 708
        C.importance *= DECAY                                             ⎭
    } satisfy_again:
        result = satisfy(cnf & affectingConstraints)
        if (result == satisfied) {
            foreach constraint partition P {
                resultP = satisfy_another_vec(P)
                if (resultP == unsatisfiable) {
                    for all constraint C in P and also in the unsatisfiable core {
                        C.importance += INCREMENT                         ─712
                        add C to affectingConstraints
                    }
                    goto satisfy_again                                    ⎫ 710
                } else if (resultC == inconclusive) {
                    return inconclusive
                }
            }
            return satisfied
        } else if (result == unsatisfiable) {
            return unsatisfiable
        } else if (result == inconclusive) {
            return inconclusive
        }
}
```

*FIG. 7*

EFFICIENTLY DETERMINING BOOLEAN SATISFIABILITY WITH LAZY CONSTRAINTS

This application is a continuation of application Ser. No. 13/092,262, filed Apr. 22, 2011, status pending.

BACKGROUND

The present application relates generally to an improved data processing apparatus and method and more specifically to mechanisms for efficiently determining Boolean satisfiability with lazy constraints.

Boolean satisfiability (SAT) is the problem of finding an assignment to variables such that a system of logic relationships are all true. SAT is used as a subroutine in many Electronic Design Automation algorithms, including algorithms in logic synthesis and verification.

Constraints are logical conditions that are assumed to always hold. Constraints are used for applications in logic synthesis and verification. Constraints may represent user assumptions either on the operation of a design or on a design environment. Constraints may also represent assumptions that the algorithms themselves make.

Temporal induction, an algorithm used extensively in both logic synthesis and verification, is an example of an algorithm that utilizes constraints. Let A and B be two nets in a design and suppose a presumption is made that A=B. A check may be made that A=B in all reachable states using temporal induction: the "base case" involves checking that A=B holds in all initial states, and the "inductive step" involves checking that for all state transitions S1→S2, if A=B on S1 then A=B on S2. Often the inductive step is implemented using a constraint that A=B on S1. Temporal induction commonly checks many equivalences simultaneously, leading to a large number of constraints.

Constraints can be applied in SAT by conjoining the constraint with the original problem. Conjoining the constraint with the original problem enlarges the effective SAT problem and forces the solver to satisfy both the original problem and all constraints. When the number of constraints is large, the size of this effective SAT problem may be dominated by the constraints alone. The large effective problem size may also mean that the runtime of SAT is undesirably long.

SUMMARY

In one illustrative embodiment, a method, in a data processing system, is provided for efficiently determining Boolean satisfiability (SAT) using lazy constraints. The illustrative embodiment determines whether a SAT problem is satisfied without constraints in a list of constraints. The illustrative embodiment fixes a set of variable assignments determined in satisfying the SAT problem without constraints in response to the SAT problem being satisfied without constraints. For each constraint in the list of constraints, the illustrative embodiment determines whether the SAT problem with the constraint results in the set of variable assignments remaining constant. The illustrative embodiment adds the constraint to a list of non-affecting constraints in response to the SAT problem with the constraint resulting in the set of variable assignments remaining constant. The illustrative embodiment then returns a satisfied result.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts one example of a satisfy_another(constraint) algorithm in accordance with an illustrative embodiment;

FIG. 5 depicts one example of a satisfy_lazy(cnf,constraints) algorithm in accordance with an illustrative embodiment;

FIG. 6 depicts one example of a satisfy_lazy(cnf,constraints) algorithm with constraint importance in accordance with an illustrative embodiment;

FIG. 7 depicts one example of a satisfy_lazy(cnf,constraints) algorithm that uses a satisfy_another_vec(cnf,constraints) algorithm in accordance with an illustrative embodiment.

DETAILED DESCRIPTION

In order to alleviate large effective Boolean satisfiability (SAT) problem size as well as any undesirably long runtime of SAT, the illustrative embodiments provide a mechanism for efficiently determining Boolean satisfiability with "lazy constraints." The illustrative embodiments do not form an effective SAT problem by conjoining all constraints into the original problem. Instead, the illustrative embodiments add the constraints to the effective SAT problem as they are deemed relevant. Often there are few constraints that can affect the overall satisfiability of the effective SAT problem and, by not considering the irrelevant constraints, the SAT solver may be sped up dramatically.

Figure 1:
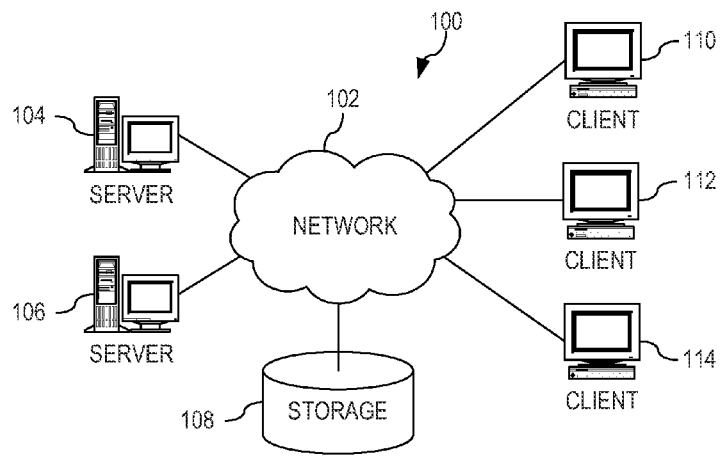
FIG. 1 depicts a pictorial representation of an example distributed data processing system in which aspects of the illustrative embodiments may be implemented.
Figure 2:
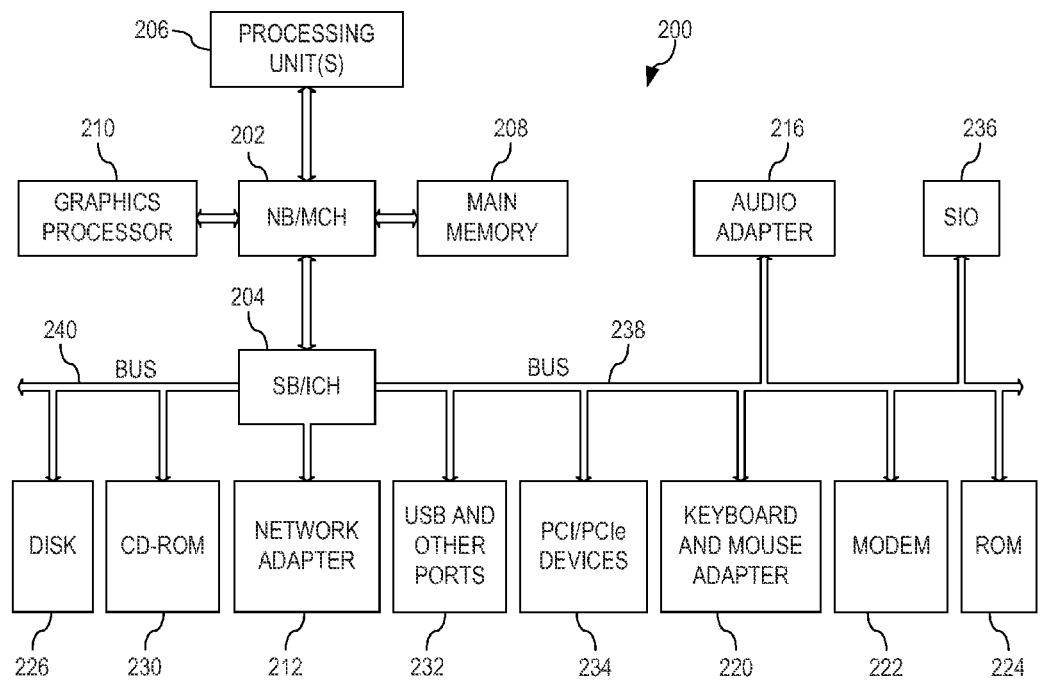
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 306 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 102, and 314 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

There are numerous application domains which dramatically benefit from the use of "lazy constraints." The provided "lazy constraint" scheme dramatically improves the performance of Boolean satisfiability (SAT) solvers on problems that have many constraints. Experiments demonstrate that the "lazy constraint" scheme often reduces the number of constraints to be considered by two or three orders of magnitude, resulting frequently in one to two orders of magnitude speedup to the overall SAT solving process. This enables dramatic scalability benefits in verification and logic synthesis applications which require the solution of constrained problems, e.g. to identify redundancies in the design being analyzed which imply reduction potential. In addition, the use of the "lazy constraints" scheme also provides the calling application useful information about which constraints were relevant to the satisfiability of the problem. This allows higher-level synthesis and verification frameworks to more intelligently manage these constraints, e.g., they provide automated hints to a verification engineer on which environmental assumptions may truly be unnecessary to the validity of the properties being checked, in turn reducing manual effort in the verification cycle by minimizing the amount of manual audit necessary between the verification engineer working on a particular design under test, the designer of the corresponding design under test, and the verification and design engineers working on adjacent logic which drives the constrained signals. Furthermore, this information may be used to identify improved "robustness" metrics of a given design, which may increase its intellectual property (IP) reuse value or tolerance to post-silicon operational-mode patches to system flaws.

Figure 3:
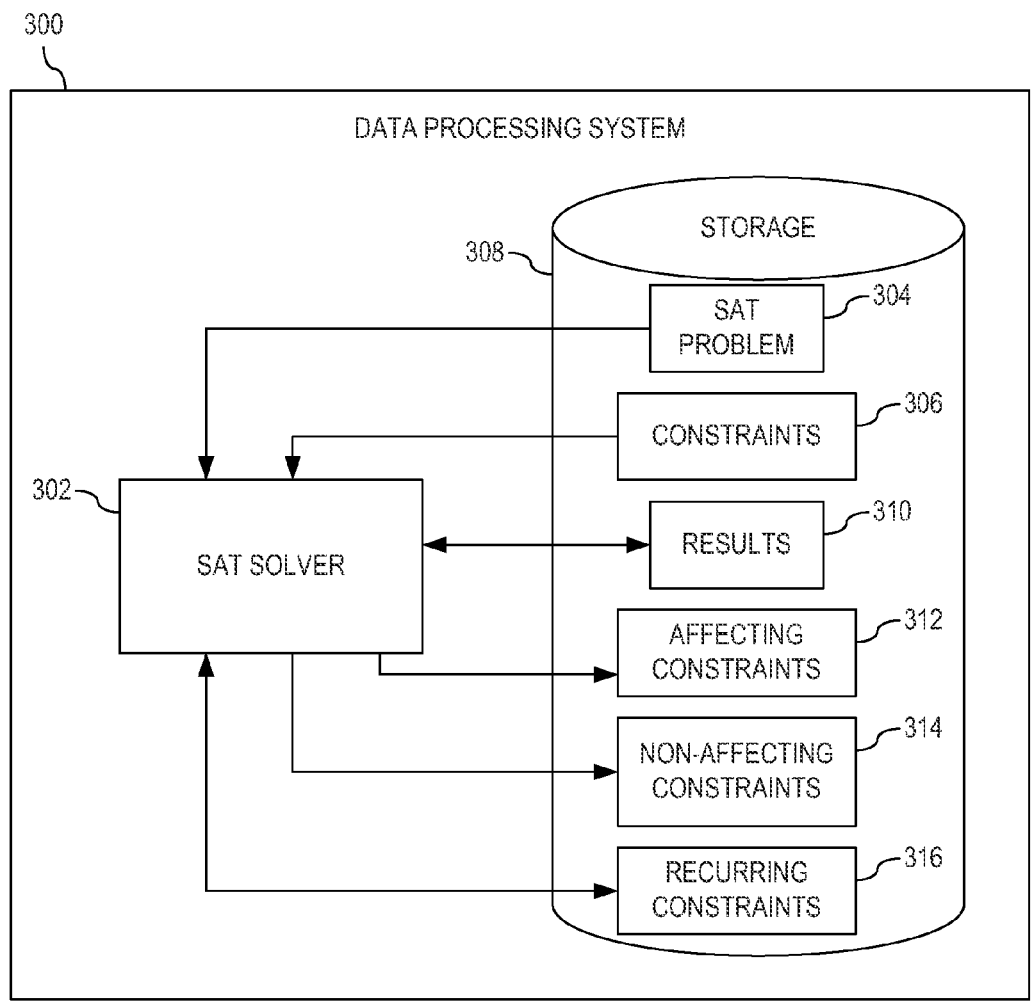
FIG. 3 depicts a block diagram of a mechanism for efficiently determining Boolean satisfiability with "lazy constraints" for a Boolean satisfiability (SAT) problem in accordance with an illustrative embodiment.

FIG. 3 depicts a block diagram of a mechanism for efficiently determining Boolean satisfiability with "lazy constraints" for a Boolean satisfiability (SAT) problem in accordance with an illustrative embodiment. The SAT problem may be represented either in a conjunctive normal form (cnf) or as a circuit. Data processing system 300 comprises SAT solver 302 which receives inputs of SAT problem 304 and list of constraints 306, which may both be stored in storage 308.

Initially, SAT solver 302 uses a satisfy(cnf/circuit) algorithm to verify whether SAT problem 304 may be satisfied without any constraints in list of constraints 306 being applied. Using the satisfy(cnf/circuit) algorithm, SAT solver 302 provides one of three results 310 for SAT problem 304: satisfiable, unsatisfiable, or inconclusive. Satisfiable indicates that an assignment to variables of SAT problem 304 was found such that the logical relationships in the SAT problem all evaluate to 1. Unsatisfiable indicates that no such assignment to variables of SAT problem 304 exists. Modern SAT solvers can provide an "unsatisfiable core" that indicates which parts of the problem are responsible for the unsatisfiability. Inconclusive indicates that SAT solver 302 was unable to find a satisfying assignment for some reason other than unsatisfiability. This return value is often used to indicate that SAT solver's 302 computational resources were exhausted before SAT solver 302 finished its search.

After satisfy(cnf/circuit) finds that its problem is satisfiable, SAT solver 302 selects a first constraint from list of constraints 306 and uses a satisfy_another(constraint) algorithm to verify whether SAT problem 304 may be satisfied with the first constraint. Using the satisfy_another(constraint) algorithm, SAT solver 302 provides one of the three results 310 for SAT problem 304 with the first constraint, either satisfiable, unsatisfiable, or inconclusive. If the SAT problem 304 with the first constraint is satisfiable, the satisfy_another (constraint) algorithm is used to satisfy one additional constraint without changing the assignments to the existing variables. In this way, the assignment to variables of SAT problem 304 may be extended to satisfy one additional constraint that was not present in the original problem. An indication of unsatisfiable by SAT solver 302 using the satisfy_another (constraint) algorithm does not indicate that SAT problem 304, along with previously satisfied constraints, plus the current constraint is unsatisfiable. Rather, an indication of unsatisfiable by SAT solver 302 using the satisfy_another(constraint) algorithm merely indicates that SAT problem 304, along with previously satisfied constraints, plus the current constraint may not be satisfied using the set of currently assigned variables. However, there may be some other set of variable assignments in which SAT problem 304, along with previously satisfied constraints, plus the current constraint is satisfiable.

FIG. 4 depicts one example of a satisfy_another(constraint) algorithm in accordance with an illustrative embodiment. In satisfy_another(constraint) algorithm 400 line 402, satisfy_another(constraint) algorithm 400 illustrates the addition of one additional constraint. At line 404, satisfy_another(constraint) algorithm 400 fixes the previous assignments that satisfied the SAT problem with or without previous constraints. Then at line 406, satisfy_another(constraint) algorithm 400 runs the satisfy(cnf/circuit) algorithm with the new constraint.

Returning to FIG. 3, the illustrative embodiments use the satisfy(cnf/circuit) algorithm and the satisfy_another(constraint) algorithm, as well as other steps, to form a "lazy constraint" algorithm, which is referred to a satisfy_lazy(cnf, constraints) algorithm. SAT solver 302 uses the satisfy_lazy (cnf,constraints) algorithm to solve SAT problem 304 in either a conjunctive normal form (cnf) or circuit form along with list of constraints 306 and returns results 310, which may be either satisfiable, unsatisfiable, or inconclusive. In this way, the satisfy_lazy(cnf,constraints) algorithm replaces satisfy(cnf/circuit) in most applications, which provides for a lazy constraint scheme to benefit many applications with only minor changes to SAT solver 302.

In operation, SAT solver 302 uses the satisfy_lazy(cnf, constraints) algorithm to solve SAT problem 304 along with the constraints in list of constraints 306. The satisfy_lazy(cnf, constraints) algorithm creates a list of affecting constraints 312 to track which constraints that directly affect SAT problem 304, as well as a list of non-affecting constraints 314, to track which constraints do not directly affect SAT problem 304. Initially, the satisfy_lazy(cnf,constraints) algorithm verifies whether SAT problem 304 may be satisfied without any constraints in list of constraints 306 being applied and provides one of three results 310 for SAT problem 304: satisfiable, unsatisfiable, or inconclusive.

If the satisfy_lazy(cnf,constraints) algorithm determines that SAT problem 304 without any constraints is inconclusive, then adding additional constraints will not make SAT problem 304 conclusive, and the satisfy_lazy(cnf,constraints) algorithm returns inconclusive result 310 to SAT solver 302. If the satisfy_lazy(cnf,constraints) algorithm determines that SAT problem 304 without any constraints is unsatisfiable, i.e. no variable assignments could be determined to satisfy SAT problem 304, then adding additional constraints to SAT problem 304 will not affect this unsatisfiability. The satisfy_lazy(cnf,constraints) algorithm returns unsatisfiable result 310 to SAT solver 302.

If the satisfy_lazy(cnf,constraints) algorithm determines that SAT problem 304 without any constraints is satisfiable, then the satisfy_lazy(cnf,constraints) algorithm begins a loop over all constraints in list of constraints 306 by first fixing the variable assignments that were determined in satisfying SAT problem 304 without any constraints. Using a satisfy_another (constraint) portion of the satisfy_lazy(cnf,constraints) algorithm, the satisfy_lazy(cnf,constraints) algorithm determines whether SAT problem 304 can be verified with the constraint. That is, the satisfy_lazy(cnf,constraints) algorithm determines whether the addition of a constraint from list of constraints 306 results in the variable assignments that were determined in satisfying SAT problem 304 without any constraints stay (satisfied), changes (unsatisfied), or is inconclusive (timeout).

If the addition of a constraint from the list of constraints to SAT problem 304 results in a result of inconclusive, then adding additional constraints will not make SAT problem 304 with constraints conclusive, and the satisfy_lazy(cnf,constraints) algorithm returns inconclusive result 310 to SAT solver 302. If the addition of a constraint from list of constraints 306 to SAT problem 304 results in a result of satisfied, then the satisfy_lazy(cnf,constraints) algorithm adds the currently added constraint to list of non-affecting constraints 314. While the addition of the constraint resulted in the result of satisfied with the variable assignments being fixed, other variables may be determined that are required to satisfy SAT problem 304 with the constraint. That is, the addition of the constraint may require other inputs that were not required by the original SAT problem 304 and thus were not fixed. The determination of such variable assignments does not result in an unsatisfiable, rather just a new variable assignment that needs to be fixed upon the addition of a new constraint. The satisfy_lazy(cnf,constraints) algorithm then adds another constraint from list of constraints 306 and verifies whether SAT problem 304 can be verified using the fixed variable assignments plus any new fixed variable added by a previously verified constraint.

If the addition of a constraint from list of constraints 306 to SAT problem 304 results in a result of unsatisfied, then the satisfy_lazy(cnf,constraints) algorithm determines that the existing fixed variable assignments are inconsistent with this new constraint. The satisfy_lazy(cnf,constraints) algorithm adds the currently added constraint to list of affecting constraints 312 and then uses the satisfy(cnf/circuit) algorithm to verify whether SAT problem 304 may be satisfied with the previously added constraints and the current constraint from list of constraints 306. If the satisfy_lazy(cnf,constraints) algorithm determines that SAT problem 304 with the previously added constraints and the current constraint is inconclusive, then adding additional constraints will not make SAT problem 304 conclusive, and the satisfy_lazy(cnf,constraints) algorithm returns inconclusive result 310 to SAT solver 302.

If the satisfy_lazy(cnf,constraints) algorithm determines that SAT problem 304 with the previously added constraints and the current constraint is unsatisfiable, i.e. no variable assignments could be determined to satisfy SAT problem 304, then adding additional constraints to SAT problem 304 will not affect this unsatisfiability. The satisfy_lazy(cnf,constraints) algorithm returns unsatisfiable result 310 to SAT solver 302. If the satisfy_lazy(cnf,constraints) algorithm determines that SAT problem 304 with the previously added constraints and the current constraint is satisfiable, then the satisfy_lazy(cnf,constraints) algorithm again begins to a loop over the remaining constraints in list of constraints 306 using a new set of fixed variable assignments in the manner described above.

FIG. 5 depicts one example of a satisfy_lazy(cnf,constraints) algorithm in accordance with an illustrative embodiment. In satisfy_lazy(cnf,constraints) algorithm 500 at line 502, satisfy_lazy(cnf,constraints) algorithm 500 sets a list of affecting constraints to empty. In section 504, satisfy_lazy (cnf,constraints) algorithm 500 determines whether the SAT problem may be satisfied with or without constraints in the list of constraints and provides one of three results for the SAT problem: satisfiable, unsatisfiable, or inconclusive, as has been previously described.

Returning to FIG. 3, it is common for a SAT solver, such as SAT solver 302, to be called on a series of related SAT problems, which may be known as "incremental SAT." Often, the list of constraints does not change as the SAT solver 302 transitions from one SAT problem to a related SAT problem. In this way, any optimization to the constraints may be used to speed up the series of related calls to SAT solver 302. As has been shown previously, the satisfy_lazy(cnf,constraints) algorithm "learns" which constraints affect satisfiability, list of affecting constraints 312, and which constraints do not affect satisfiability, list of non-affecting constraints 314. The set of constraints that affect satisfiability usually varies only minimally between related SAT problems. Computational resources are spent to learn this set of constraints that affect satisfiability and, by remembering the relevancy across series of calls to SAT solver 302, duplicate work may be avoided by SAT solver 302 and incremental SAT applications may be sped up.

Therefore, as SAT solver completes one SAT problem, SAT solver 302 adds the constraints in the list of affecting constraints 312 to a list of recurring constraints 316. In order to enhance the satisfy_lazy(cnf,constraints) algorithm, each constraint in list of recurring constraints 316 is associated with an "importance", such as a numeric representation of how relevant that constraint has been in the past. As one example, a higher importance may indicate higher relevancy, where the importance of each constraint starts at 0, although other types of indicators may be used without departing from the sprit and scope of the invention.

When the satisfy_lazy(cnf,constraints) algorithm starts on the next SAT problem, satisfy_lazy(cnf,constraints) algorithm looks to see which constraints in list of recurring constraints 316 have importance higher than a predetermined threshold. The satisfy_lazy(cnf,constraints) algorithm identifies that these constraints were highly relevant in the solving of previous SAT problems and, thus, hypothesizes that any constraint in list of recurring constraints 316 that is also in the new list of constraints 306 may be useful in the current SAT problem 304 as well. Thus, the satisfy_lazy(cnf,constraints)

algorithm adds any constraint in list of recurring constraints 316 that is also in the new list of constraints 306 to the new list of affecting constraints 312.

In order to ensure that a constraint that is relevant for one SAT problem and then not relevant in a series of related SAT problems may be "un-learned by the satisfy_lazy(cnf,constraints) algorithm, SAT solver 302 decays or decrements the importance of all constraints in list of recurring constraints 316 by multiplying the importance variables by a fixed constant decay value, which may be less than 1 and may eventually return the importance of the constraint to its ground state. Likewise, whenever a constraint is added to the list of affecting constraints 312, that constraint affects the satisfiability of the current SAT problem. Thus, when SAT solver 302 completes a SAT problem and the constraints in the list of affecting constraints 312 are added to a list of recurring constraints 316, for any constraint in list of affecting constraints 312 that is already in list of recurring constraints 316, SAT solver 302 adds a constant increment value to that constraint's importance. Thus the relationship between the increment value and the predetermined threshold value determines the number of times a constraint must be relevant before it is eagerly enabled in future SAT problems.

FIG. 6 depicts one example of a satisfy_lazy(cnf,constraints) algorithm with constraint importance in accordance with an illustrative embodiment. In satisfy_lazy(cnf,constraints) algorithm 600 at line 602, satisfy_lazy(cnf,constraints) algorithm 600 sets a list of affecting constraints to empty. In section 604, satisfy_lazy(cnf,constraints) algorithm 600 adds the constraints in the list of affecting constraints for a previous SAT problem to a list of recurring affecting constraints. In section 606, satisfy_lazy(cnf,constraints) algorithm 600 decays or decrements the importance of all constraints in the list of recurring affecting constraints. In section 608, satisfy_lazy(cnf,constraints) algorithm 600 determines whether the SAT problem may be satisfied with or without constraints in the list of constraints and provides one of three results for the SAT problem: satisfiable, unsatisfiable, or inconclusive, as has been previously described. In line 610, satisfy_lazy(cnf,constraints) algorithm 600 adds a constant increment value to a constraint in the current list of affecting constraints that is already in list of recurring affecting constraints.

Therefore, the proposed lazy constraint scheme of the illustrative embodiments may be implemented on top of any existing SAT solver. The satisfy_lazy(cnf,constraints) algorithms shown in FIGS. 5 and 6 make use of the satisfy_another( ) algorithm shown in FIG. 4. The satisfy_another(constraint) algorithm may be implemented inside of any SAT solver. However, in some SAT solvers it may not be efficient to call the satisfy_another(constraint) algorithm on each of a large number of constraints. When the number of constraints are large, an alternate satisfy_another_vec(cnf,constraints) algorithm may be implemented to satisfy a vector, group, or partition of constraints in a single call.

Returning to FIG. 3, in operation, the satisfy_another_vec (cnf,constraints) algorithm partitions list of constraints 306 into a number N of partitions based on an importance associated with the constraints. The importance of each constraint may be identified by an administrator or determined by SAT solver 302 based on an effect of a constraint as described above. Thus, for example, the satisfy_another_vec(cnf,constraints) algorithm may partition list of constraints 306 into two partitions where one partition has an importance greater than a predetermined threshold and the second partition has an importance between zero and the predetermined threshold.

The satisfy_another_vec(cnf,constraints) algorithm proceeds in a manner identical to the satisfy_lazy(cnf,constraints) algorithm shown in FIG. 6 until the satisfy(cnf/circuit) portion of the satisfy_lazy(cnf,constraints) algorithm returns satisfied result 310. When the satisfy(cnf/circuit) portion returns the satisfied result 310, the satisfy_lazy(cnf,constraints) algorithm calls the satisfy_another_vec(cnf,constraints) portion of the satisfy_lazy(cnf,constraints) algorithm on each constraint partition in an attempt to extend the counterexample to all constraints in the constraint partition. Because of partitioning, the satisfy_another_vec(cnf, constraints) portion is more granular than prior eager constraint methods and more course than the satisfy_lazy(cnf, constraints) algorithms of FIGS. 5 and 6.

The "resultP" variable captures the value returned by the satisfy_another_vec(cnf,constraints) portion when called on constraint partition P. If the result in resultP is unsatisfiable then, similar to previously discussed satisfy_lazy(cnf,constraints) algorithms, the existing assignment is not compatible with at least one constraint in constraint partition P. To determine which constraint in constraint partition P is responsible, satisfy_another_vec(cnf,constraints) portion inspects the unsatisfiable constraint partition P, which may also be referred to as an unsatisfiable core, to identify the reason that resultP is unsatisfiable. Constraints in constraint partition P that appear in the unsatisfiable core are relevant to the problem. As before, these constraints are added to list of affecting constraints 312 and their importance attributes are updated in list of recurring constraints 316.

Partitioning constraints and handling constraints in a partition-wise manner with the satisfy_another_vec(cnf,constraints) algorithm has proven to be useful in achieving significant speedups in the satisfy_lazy(cnf,constraints) algorithm for SAT solvers that fail to handle individual satisfy_another(constraint) algorithm calls efficiently.

FIG. 7 depicts one example of a satisfy_lazy(cnf,constraints) algorithm that uses a satisfy_another_vec(cnf,constraints) algorithm in accordance with an illustrative embodiment. In satisfy_another_vec(cnf,constraints) algorithm 700 at line 702, satisfy_another_vec(cnf,constraints) algorithm 700 partitions the list of constraints into at least two partitions where one partition has an importance greater than a predetermined threshold and the second partition has an importance between zero and the predetermined threshold. At line 704, satisfy_another_vec(cnf,constraints) algorithm 700 sets the list of a list of affecting constraints to empty. In section 706, satisfy_another_vec(cnf,constraints) algorithm 700 adds the constraints in the list of affecting constraints for a previous SAT problem to a list of recurring affecting constraints. In section 708, satisfy_another_vec(cnf,constraints) algorithm 700 decays or decrements the importance of all constraints in the list of recurring affecting constraints. In section 710, satisfy_another_vec(cnf,constraints) algorithm 700 determines whether the SAT problem may be satisfied with or without constraints in the list of constraints and provides one of three results for the SAT problem: satisfiable, unsatisfiable, or inconclusive, as has been previously described. In line 712, satisfy_another_vec(cnf,constraints) algorithm 700 adds a constant increment value to a constraints in the current list of affecting constraints that is already in list of recurring affecting constraints.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8:
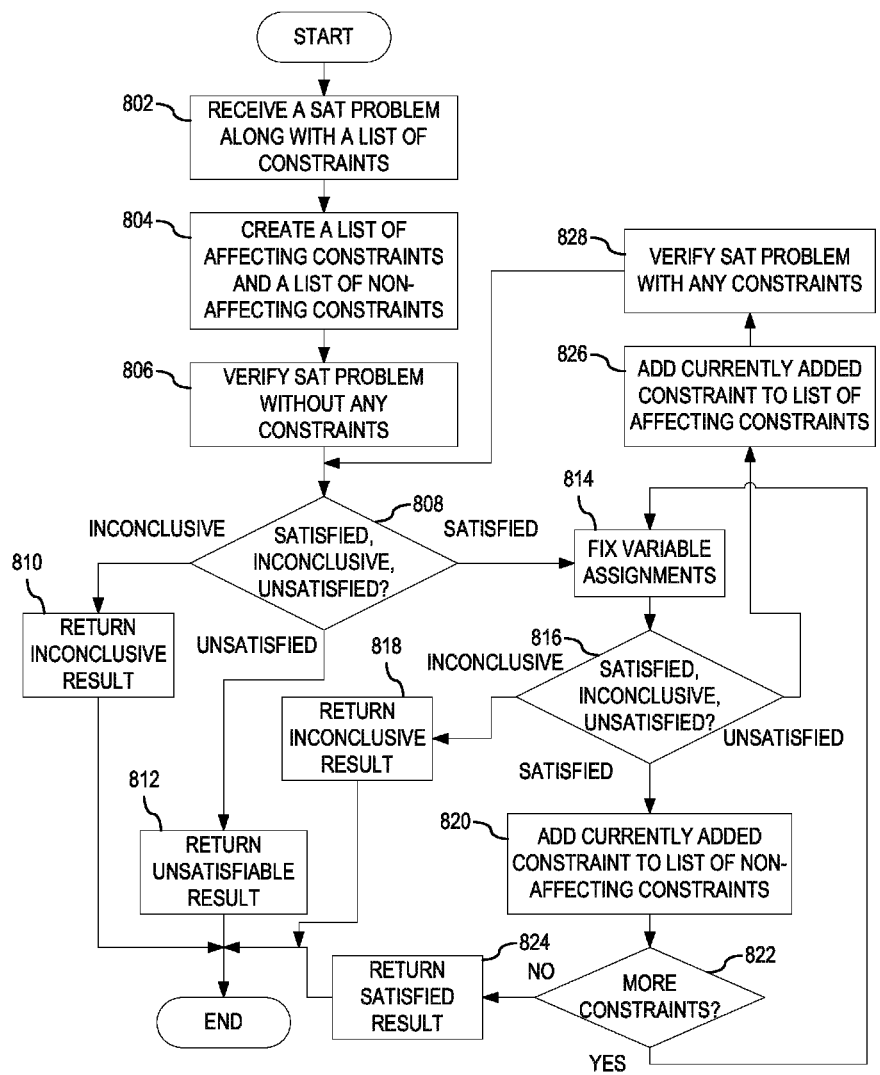
FIG. 8 depicts a flowchart outlining example operations performed by an SAT solver for efficiently determining Boolean satisfiability using "lazy constraints" in accordance with an illustrative embodiment.

FIG. 8 depicts a flowchart outlining example operations performed by an SAT solver for efficiently determining Boolean satisfiability using "lazy constraints" in accordance with an illustrative embodiment. The SAT solver uses a satisfy_lazy(cnf,constraints) algorithm to solve SAT problem(s) in either a conjunctive normal form (cnf) or circuit form along with a list of constraints and returns results of the execution, which may be either satisfiable, unsatisfiable, or inconclusive. As the operation begins, the satisfy_lazy(cnf,constraints) algorithm receives a SAT problem along with a list of constraints (step 802). The satisfy_lazy(cnf,constraints) algorithm creates a list of affecting constraints to track which constraints directly affect the SAT problem as well as a list of non-affecting constraints to track which constraints do not directly affect the SAT problem (step 804). Initially, the satisfy_lazy(cnf,constraints) algorithm verifies whether the SAT problem may be satisfied without any constraints in the list of constraints being applied (step 806). The satisfy_lazy(cnf, constraints) algorithm determines whether the verification of the SAT problem may be satisfied without any constraints in the list of constraints results in a satisfiable, unsatisfiable, or inconclusive result (step 808).

If at step 808 the satisfy_lazy(cnf,constraints) algorithm determines that the SAT problem without any constraints is inconclusive, then adding additional constraints will not make the SAT problem conclusive, and the satisfy_lazy(cnf, constraints) algorithm returns an inconclusive result to the SAT solver (step 810), with the operation ending thereafter. If at step 808 the satisfy_lazy(cnf,constraints) algorithm determines that the SAT problem without any constraints is unsatisfiable, i.e. no variable assignments could be determined to satisfy the SAT problem, then adding additional constraints to the SAT problem will not affect this unsatisfiability, and the satisfy_lazy(cnf,constraints) algorithm returns an unsatisfiable result to the SAT solver (step 812), with the operation ending thereafter.

If at step 808 the satisfy_lazy(cnf,constraints) algorithm determines that the SAT problem without any constraints is satisfiable, then the satisfy_lazy(cnf,constraints) algorithm begins a loop over all constraints in the list of constraints by first fixing the variable assignments that were determined in satisfying the SAT problem without any constraints (step 814). Using a satisfy_another(constraint) portion of the satisfy_lazy(cnf,constraints) algorithm, the satisfy_lazy(cnf, constraints) algorithm uses a first constraint from the list of constraints to determine whether the SAT problem results in the variable assignments that were determined in satisfying the SAT problem without any constraints stays (satisfied), changes (unsatisfied), or is inconclusive (timeout) (step 816).

If at step 816 the addition of a constraint from the list of constraints to the SAT problem results in a result of inconclusive, then adding additional constraints will not make the SAT problem with constraints conclusive, and the satisfy_lazy (cnf,constraints) algorithm returns an inconclusive result to the SAT solver (step 818), with the operation ending thereafter. If at step 816 the addition of a constraint from the list of constraints to the SAT problem results in a result of satisfied, then the satisfy_lazy(cnf,constraints) algorithm adds the currently added constraint to the list of non-affecting constraints (step 820). While the addition of the constraint resulted in the result of satisfied with the variable assignments being fixed, other variables may be determined that are required to satisfy the SAT problem with the constraint. That is, the addition of the constraint may require other inputs that were not required by the original the SAT problem and thus were not fixed. The determination of such variable assignments does not result in an unsatisfiable, rather just a new variable assignment that needs to be fixed upon the addition of a new constraint. The satisfy_lazy(cnf,constraints) algorithm then determines whether there is another constraint from the list of constraints (step 822). If at step 822 there is another constraint in the list of constraints, then the operation returns to step 814. If at step 822 there is not another constraint in the list of constraints, the satisfy_lazy(cnf,constraints) algorithm returns an satisfied result to the SAT solver (step 824) with the operation ending thereafter.

If at step 816 the addition of a constraint from the list of constraints to the SAT problem results in a result of unsatisfied, then the satisfy_lazy(cnf,constraints) algorithm determines that the existing fixed variable assignments are inconsistent with this new constraint and adds the currently added constraint to the list of affecting constraints (step 826). The satisfy_lazy(cnf,constraints) algorithm then proceeds to verify whether the SAT problem may be satisfied, but this time with the previously added constraints and the current constraint from the list of constraints (step 828), with the operation proceeding to step 808 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for alleviating large effective Boolean satisfiability (SAT) problem size as well as any undesirably long runtime of SAT. The illustrative embodiments provide a mechanism for efficiently determining Boolean satisfiability with "lazy constraints." The illustrative embodiments do not form an effective SAT problem by conjoining all constraints into the original problem. Instead, the illustrative embodiments add the constraints to the effective SAT problem as they are deemed relevant. Often there are few constraints that can affect the overall satisfiability of the effective SAT problem and, by not considering the irrelevant constraints, the SAT solver is sped up dramatically.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for efficiently determining Boolean satisfiability (SAT) using lazy constraints, the method comprising:
   determining, by a processor in the data processing system, whether a SAT problem is satisfied without applying constraints in a list of constraints;
   responsive to the SAT problem being satisfied without applying the constraints in the list of constraints, fixing, by the processor, a set of variable assignments determined in satisfying the SAT problem without applying the constraints in the list of constraints;
   for each constraint in the list of constraints, determining, by the processor, whether the set of variable assignments remain constant when applying the constraint to the SAT problem;
   responsive to the set of variable assignments remaining constant when applying the constraint to the SAT problem:

adding, by the processor, the constraint to a list of non-affecting constraints to track constraints from the list of constraints that do not directly affect the SAT problem; and returning, by the processor, a satisfied result; and responsive to the set of variable assignments changing when applying the constraint to the SAT problem:

adding, by the processor, the constraint to a list of affecting constraints to track constraints from the list of constraints that directly affect the SAT problem;

unfixing, by the processor, the set of variable assignments determined in satisfying the SAT problem without applying the constraints in the list of constraints;

determining, by the processor, whether the SAT problem is satisfiable with the constraint being applied;

responsive to the SAT problem being satisfied with the constraint, fixing, by the processor, a new set of variable assignments determined in satisfying the SAT problem with the constraint being applied; and for each remaining constraint in the list of constraints, continuing, by the processor, with determining whether the SAT problem with the constraint results in the new set of variable assignments remain constant, change, or are inconclusive.

2. The method of claim 1, further comprising:

responsive to the SAT problem with the constraint resulting in the set of variable assignments timing out, returning, by the processor, an inconclusive result, wherein the inconclusive result indicates adding constraints will not make the SAT problem conclusive.

3. The method of claim 1, wherein the SAT problem is in either a conjunctive normal form (ad) or a circuit form.

4. The method of claim 1, further comprising:

responsive to the SAT problem without applying the constraints in the list of constraints being unsatisfied, returning, by the processor, a unsatisfied result, wherein the unsatisfied result indicates that adding constraints to the SAT problem will not affect the unsatisfiability of the SAT problem; and responsive to the SAT problem without applying the constraints in the list of constraints indicating that adding constraints will not make the SAT problem conclusive, returning, by the processor, an inconclusive result.

5. The method of claim 1, wherein, responsive to a subset of constraints in the list of constraints residing in a list of recurring constraints, the method further comprises:

for each constraint in the subset of constraints, determining, by the processor, whether the constraint has an associated importance value higher than a predetermined threshold; and responsive to the constraint having an associated importance value higher than the predetermined threshold, automatically adding, by the processor, the constraint to the list of affecting constraints prior to determining whether a SAT problem is satisfied without applying the constraints in the list of constraints such that the SAT problem is validated with only constraints in the subset of constraints that reside in the list of recurring constraints and have an associated importance value higher than the predetermined threshold.

6. The method of claim 5, wherein the list of recurring constraints is populated by the method comprising:

adding, by the processor, constraints previously added to a previous list of affecting constraints in verification of a previous SAT problem with constraints to the list of recurring constraints, wherein the importance value associated with each constraint in the list of recurring constraints is incremented by a first predetermined value each time the constraint appears in a new list of affecting constraints in verification of a new SAT problem and wherein the importance value associated with each constraint in the list of recurring constraints is decayed by a second predetermined value each time verification of a new SAT problem starts.

* * * * *